United States Patent
Ma et al.

(10) Patent No.: US 7,289,795 B2
(45) Date of Patent: *Oct. 30, 2007

(54) EVENT MODERATION FOR EVENT PUBLISHING ENVIRONMENTS

(75) Inventors: Yue Ma, West Windsor, NJ (US); Dennis Bushmitch, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 11/159,057

(22) Filed: Jun. 22, 2005

(65) Prior Publication Data

US 2006/0293033 A1    Dec. 28, 2006

(51) Int. Cl.
*H04M 3/42* (2006.01)
*H04M 3/00* (2006.01)
*H04L 29/08* (2006.01)

(52) U.S. Cl. ............... 455/414.1; 455/414.2; 455/414.4; 455/419

(58) Field of Classification Search .......... 455/414.1, 455/414.2, 414.4, 419
See application file for complete search history.

(56) References Cited

U.S. PATENT DOCUMENTS

| 2002/0103898 | A1* | 8/2002 | Moyer et al. | 709/224 |
| 2003/0217136 | A1 | 11/2003 | Cho et al. | |
| 2004/0128344 | A1 | 7/2004 | Trossen | |
| 2004/0255302 | A1 | 12/2004 | Trossen | |
| 2005/0232283 | A1* | 10/2005 | Moyer et al. | 370/401 |
| 2006/0004924 | A1* | 1/2006 | Trossen | 709/228 |
| 2006/0140199 | A1* | 6/2006 | Ma et al. | 370/401 |
| 2006/0165007 | A1* | 7/2006 | Wu | 370/252 |

OTHER PUBLICATIONS

Bushmitch, D., et al., "A SIP-based Device Communication Service for OSGi Framework," Proceedings of the IEEE Consumer Communications and Networking Conference, Las Vegas, Jan. 2004.
Session Initiation Protocol (SIP)-Specific Event Notification: SIP RFC (3265), Jun. 2002.

* cited by examiner

*Primary Examiner*—Barry Taylor
(74) *Attorney, Agent, or Firm*—Harness, Dickey & Pierce, PLC

(57) ABSTRACT

An event moderating architecture is provided for exporting event notification messages from an event publishing environment. The event moderating architecture includes: a mobile network device residing outside of the event publishing environment and operable to formulate a subscription request for receiving event notification messages; and an event moderation module adapted to receive the subscription request from the mobile network device and translate the subscription request into a subscription with the event publishing environment. The event moderation module receives a subset of event notification messages from the event publishing environment and forwards select event notification messages in accordance with the subscription request to the mobile network device.

27 Claims, 3 Drawing Sheets

EVENT MODERATION FOR EVENT PUBLISHING ENVIRONMENTS

FIELD OF THE INVENTION

The present invention relates generally to event moderation for an event publishing environment, such as a UPnP network, and, more particularly, to an event moderating architecture that enables exportation of event notification messages to mobile network devices residing outside of the event publishing environment.

BACKGROUND OF THE INVENTION

Universal Plug and Play (UPnP) protocol is an emerging plug-and-play protocol for interconnecting network devices. Within UPnP, a control point may wish to respond to state changes in a network device. Eventing is the mechanism which allows control points to register for and receive notification of such state changes. Currently, an event is generated whenever there is a change in a state variable. To the extent that an UPnP service supports more than one state variable, there are no provisions for eventing on a state variable by state variable basis nor on the basis of other user customizable moderation parameters. Therefore, it is desirable to provide a more efficient mechanism for moderating event notification traffic on a state variable basis or some other user customization moderation parameter.

Due to the nature of UPnP service discovery and eventing mechanisms, UPnP technology is typically limited to network devices that are connected in a network environment where multicasting is supported. However, bridging architectures which extend UPnP technology outside of the local network are also beginning to emerge. In these instances, signaling protocols, such as SIP, may be used as the conduit for communication with mobile network devices which lie outside of the local network. Since SIP is not intended to support the high volume network traffic associated with event notification, it is further desirable to provide an event moderating mechanism which supports exporting event notification outside of the local network.

SUMMARY OF THE INVENTION

An event moderating architecture is provided for exporting event notification messages from an event publishing environment. The event moderating architecture includes: a mobile network device residing outside of the event publishing environment and operable to formulate a subscription request for receiving event notification messages; and an event moderation module adapted to receive the subscription request from the mobile network device and translate the subscription request into a subscription with the event publishing environment, such that the event moderation module receives a subset of event notification messages from the event publishing environment and forwards select event notification messages in accordance with the subscription request to the mobile network device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

A publisher/subscriber model is typically used to implement event notification. In this model, the publisher is the source of events and grants a subscriber a subscription when the subscriber registers a request to receive events from the publisher. An exemplary event publisher is a local network having a plurality of UPnP-compliant network devices. While the following description is provided with reference to an UPnP network environment, it is readily understood that other types of event publishing environments which have a plurality of network devices broadcasting event notification messages amongst themselves in accordance with a subscription-based communication protocol are also within the scope of the present invention.

Upon the occurrence of an event, the publisher delivers an event notification message to the subscriber. In the present invention, the subscriber is preferably a mobile network device which resides outside of the event publishing environment. As a result, the mobile network device is likely to employ a different communication protocol to interface with the network devices which comprise the publishing environment. However, the broader aspects of the present invention extend to network devices which may reside within the event publishing environment and/or communicate using the same subscription-based communication protocol as employed by the network devices which comprise the event publishing environment.

An event moderation module serves as an intermediary between the mobile network device and the event publishing environment. The event moderation module moderates event notification traffic between a requesting network device and the event publishing environment. Event moderation may occur on a state variable basis or some other user customization moderation parameter as will be further described below.

Figure 1:
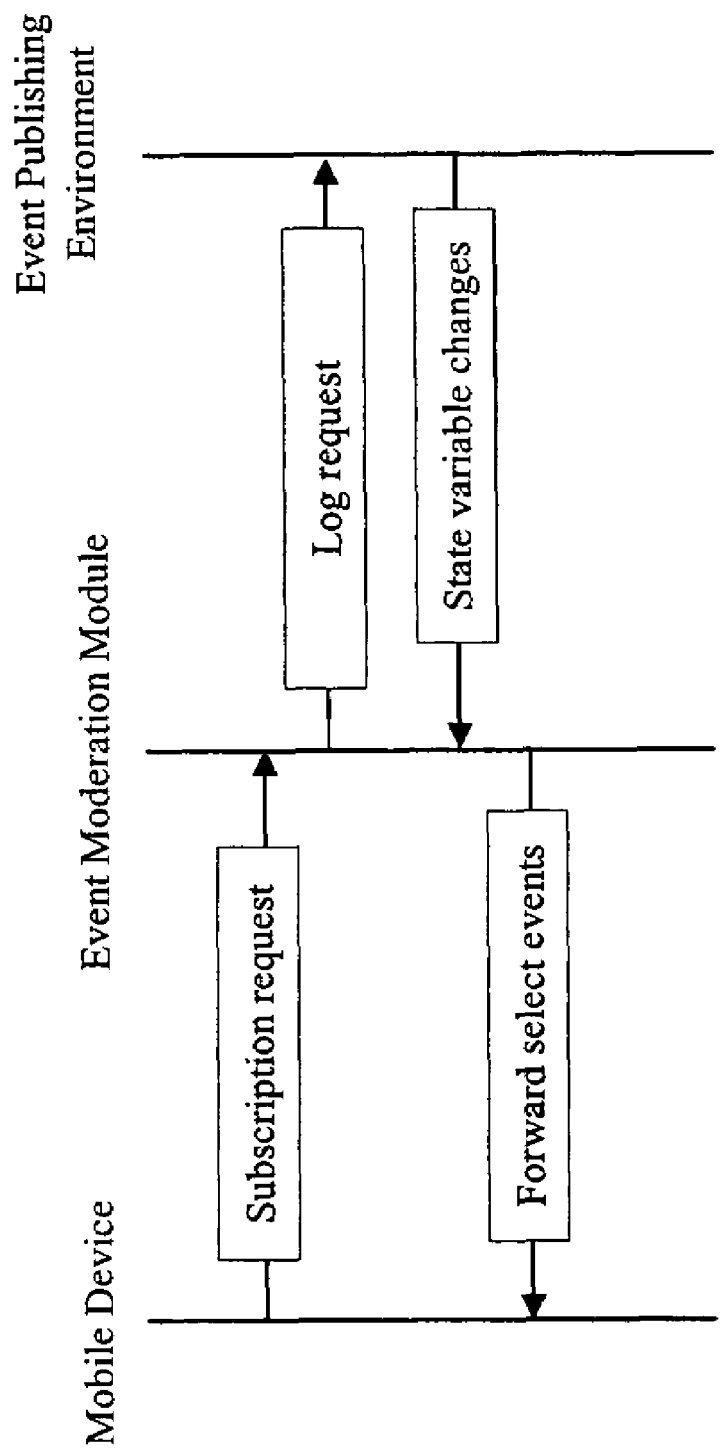
FIG. 1 is a diagram depicting the message flow of an event moderating architecture according to the principles of the present invention.

FIG. 1 provides an overview of the event moderating architecture 10 according to the present invention. Briefly, the event moderation module 16 receives a subscription request from the mobile network device 14 and translates the subscription request into an intermediary subscription with the event publishing environment 12. The event moderation module 16 in turn receives a subset of event notification messages from the event publishing environment 12 and forwards select event notification messages in accordance with the subscription request to the mobile network device 14.

Figure 2:
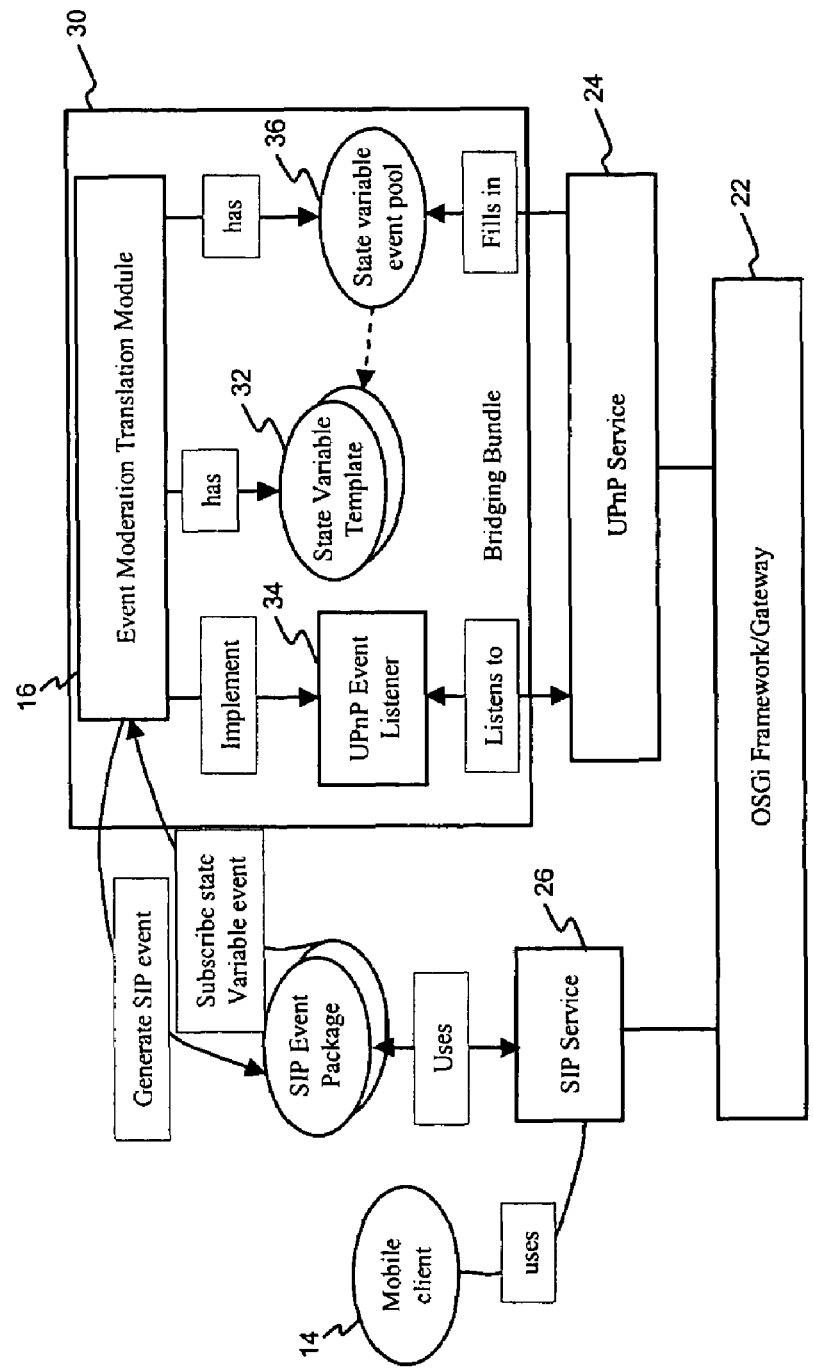
FIG. 2 is a diagram illustrating an exemplary implementation of the event moderating architecture.

The event moderating architecture of the present invention is better understood from the exemplary implementation as set forth in FIG. 2. The event moderation module 16 is integrated with a services gateway framework 22, such as the Open Services Gateway Initiative (OSGi). In a service gateway framework, applications are designed as a set of services, with each service implementing a segment of the overall functionality. These services are then packaged into an executable component commonly referred to as a bundle. The gateway framework handles basic bundle management functionality. In order to share its services with other bundles, a bundle can register any number of services with the framework.

The UPnP Device Service 24 is a service that implements the UPnP protocols in the service gateway framework and handles the interaction with bundles that use the UPnP devices. More specifically, the UPnP Device Service 24 discovers UPnP devices on the network and maps each discovered device into a gateway registered service as well as presents registered UPnP services to other registered services. Functionality of the UPnP Device Service is implemented by an UPnP Base Driver bundle. Further information regarding the UPnP Device Service maybe found in the UPnP Device Service specification, Version 1.0 which is incorporated into OSGi Service Platform specification, Release 3.

Similarly, a SIP Service 26 provides importation of SIP capabilities into the gateway framework. The SIP Service 26 exposes different interfaces which deal with SIP-specific functions, such as registration, eventing and messaging, as well as gateway-specific functions, such as SIP device registration with the framework's registry. Further information regarding this exemplary SIP Service may be found in U.S. patent application Ser. No. 10/894,469 entitled "SIP Service for Home Network Device and Service Mobility" which is incorporated by reference herein.

A SIP/UPnP bridging bundle 30 provides a communication interface between SIP entities residing outside the service gateway framework and UPnP entities residing within the service gateway framework. For instance, the bridging bundle 30 translates SIP messages from the SIP entities to a series of UPnP-specified APIs as provided by the UPnP Device Service 24. In this exemplary implementation, the event moderation module 16 is a service provided by a SIP/UPnP bridging bundle 30. The bridging bundle 30 may also supports other operations needed to fulfill the bridging function. Further information regarding an exemplary bridging bundle may be found in U.S. patent application Ser. No. 11/023,752 entitled "Extending Universal Plug and Play Messaging beyond a Local Area Network".

Figure 3:
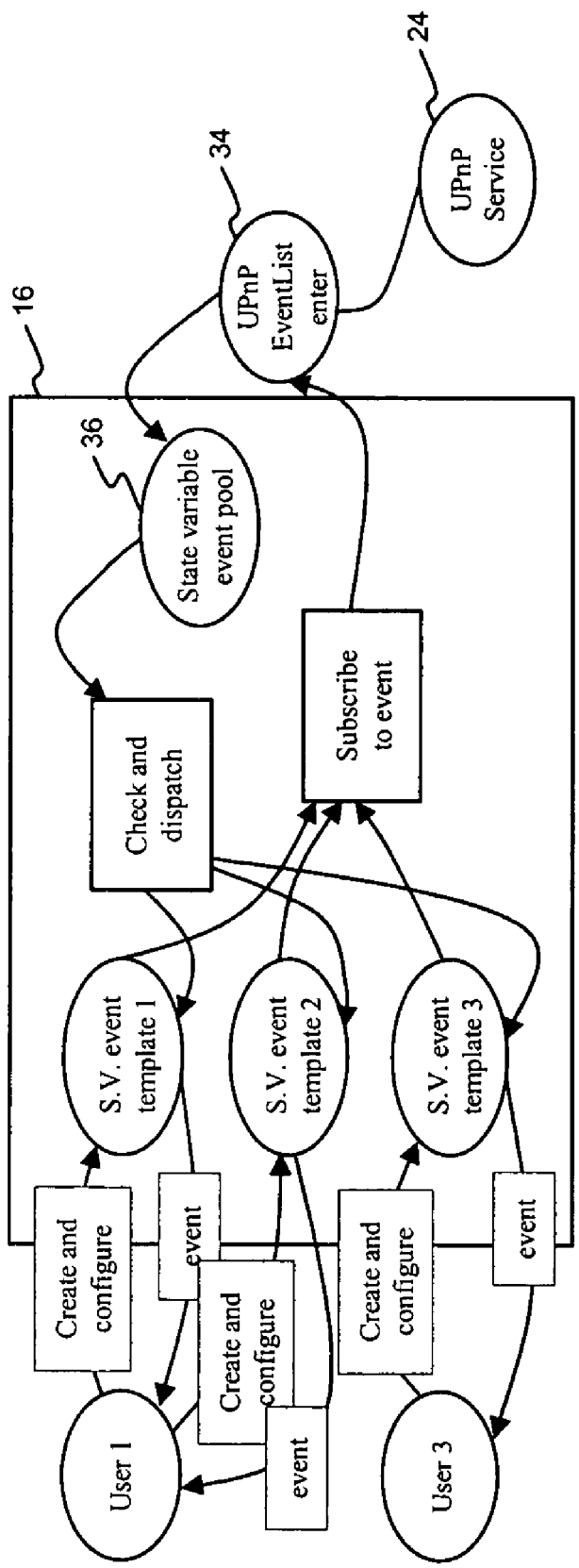
FIG. 3 is a diagram illustrating how multiple subscriptions requests are handled by the event moderating architecture.

In operation, the event moderation module 16 may receive a SIP subscription message 31 from the mobile network device 14. To translate this subscription, the event moderation module 16 first translates the subscription request into a state variable event template 32. The event template 32 is defined as a placeholder for storing user customizable moderation parameters for events associated with a given UPnP service. One event template is preferably created per state variable subscription per user for a given UPnP service. Multiple subscriptions requests are handled through the use of multiple event templates as shown in FIG. 3. Each event template is an internal data structure that resides in memory of the bridging bundle.

The information needed to configure an event template is contained in the SIP subscription message which is carried from mobile client. In the SIP subscribe header, the following parameters are defined: an event type, i.e. "UPnP.event.state_variable" and duration for the reporting template. To unsubscribe, the duration value may be set to zero. In the SIP subscribe body, the following parameters may be provided: device and service of the state variable to be evented; name of state variables to be evented; a maximum rate for reporting each state variable, a minimum change of values required for reporting each state variable; a range of values for reporting state variable values when in the range; and a range of values for reporting state variable value when outside of the range.

In UPnP architecture, all state variables will be evented as soon as they are subscribed. The SIP subscribe body may further include a first event parameter to moderate the amount of network traffic sent to the mobile device. If this Boolean parameter is set to "0", the first event associated with the subscription will be returned to the client; otherwise, it will be skipped. It is envisioned that other types of user customizable parameters may be supported by the event moderation module. Further information regarding the SIP subscription message and an exemplary schema is described at 1.1 of the appendix below.

In order to receive events, the event moderation module 16 further subscribes to the event publishing environment. In this exemplary implementation, the event moderation module 16 instantiates an UPnPEventListener object 34 by means of the OSGi Whiteboard model. The event moderation module 16 will set a filter according to the device and service names and then register with the OSGI framework 22. The UPnPEventListener 34 will in turn report all events from the requested service to the event moderation module. All reported events are stored in a single state variable event pool 36.

Upon receiving new events, the event moderation module 16 compares the incoming event to each of the state variable templates 32. First, the event moderation module 16 matches each incoming event by name to the names of the state variables specified by the templates 32. If there is not a match, then the incoming event is ignored and deleted from the state variable event pool. For each matching state variable, further filtering may be need before an event notification message is sent to the mobile client. For instance, the event moderation module determines whether the maximum reporting rate has been exceeded for that event. If not, then an event notification message may be sent. Conversely, if the maximum reporting rate has been exceeded then the event may be disregarded.

In another instance, the event moderation module monitors the change in the state variable value. When the value change exceeds a minimum change parameter for the state variable, an event notification message is sent to the mobile device. If not, the event may be disregarded by the event moderation module.

In yet another instance, the event template may specify a range of values for reporting on a particular state variable of interest, such that the event moderation module forwards the event notification messages for the particular state variable when a value for the particular state variable falls within the range. Conversely, the event template may specify an out-of-range parameter for reporting on a particular state variable of interest, such that the event moderation module forwards the event notification messages for the particular state variable when a value for the particular state variable falls outside of a range of values defined by the out-of-range parameter. It is readily understood how to formulate an appropriate moderating technique for each of the user customizable parameters.

Once each moderating parameter has been met for a given state variable, the event moderation module 16 formulates and forwards a SIP notification message to the mobile client. In the SIP message header, an event type (i.e. "UPnP.event.state_variable") needs to be specified; whereas, in the body of the SIP notification message, the following information is included: UPnP Device name, UPnP service name, and evented information pertaining to the interested state variable, such as the state variable name and value. Further information regarding the SIP notification message and an exemplary schema is described at 1.2 of the appendix below.

An event template can be referenced later by the mobile client to update the subscription or unsubscribe (cancel) the subscription. The information needed to reference to the event template are the device and service names, and the state variable name. To update a prior subscription, SIP SUBSCRIBE is used the same way as subscribing a new event. By doing this, the new event package overrides the previous one for the same state variable under same service and device. Therefore, old configurations of a prior subscription that need not be changed MUST be copied to the new event package.

Each event subscription can also be cancelled on state variable basis—i.e. one state variable event per event template. The unsubscribe function is handled in the same way as refreshing of a subscription with the SIP SUBSCRIBE, with the "expires" header set to "0". In the event package, service and device name, and state variable name are specified. Note that although SIP UNSUBSCRIBE has been defined as an extension of SIP, in the exemplary design, SUBSCRIBE is used to cancel a subscription.

In implementation, since the UPnP service state variable event is handled per UPnP service, i.e. there is only one UPnPEventListener per service, the unsubscription of a state variable event do not necessarily trigger the unregistration of UPnPEventListener to the OSGi framework. However, the "filter" property of the registered UPnPEventListener will be updated according to any new subscription/update/unsubscription. Only upon all state variable subscriptions associated with the specific UPnP service being cancelled, will such UPnPEventListener be unregistered from the framework.

Upon expiration of a subscription or upon a user unsubscribing to a state variable or upon the user unregistering with the framework, the applicable event templates will be preferably destroyed internally by the event moderation module to save the memory resource.

The description of the invention is merely exemplary in nature and, thus, variations that do not depart from the gist of the invention are intended to be within the scope of the invention. Such variations are not to be regarded as a departure from the spirit and scope of the invention.

Appendix 1.1 SIP Event Subscription
1. Subscribe system event (i.e. other UPnP device register/unregistered on the network) with eventType specified in the SIP subscribe header. The event type is "UPnP.event.device".
2. Subscribe UPnP state variable event
   i. eventType specified as "UPnP.event.state_variable" in the subscribe header
   ii. event moderation configurations contained in the SIP event package in the SIP subscribe body.

1.1.1 Event package/filter Description

The event filter could be set during SIP notification subscription. The SIP subscription update replaces the previous setting of the filter. The filter is the set of rules in the XML document format. Filter describes the rules to choose the UPnP events which would be transferred from the gateway to the client.

The root tag for filter is the <filter>. . . </filter>. There are two groups UPnP events that could be generated by the UPnP environment and transferred to the UPnP2SIP client: UPnP device status update events and UPnP state variable value update evens. All these groups should be places in the same <filter> . . . </filter> block.

Note: The "<filter></filter>" means no any events allowed.

There is a hierarchical structure that addresses the UPnP state variables within theirs devices and services. The section between the <device> and </device> tags defines the filter for devices, whose events will be processed. Events from the devices, that do not match the filter, will be ignored.

Devices are selected by the udn attribute which specifies the UPnP UDN of the device.

Within the <device> and </device> tags there is a list of rules for filtering services. These rules are placed in the <service> tag. The <service> tag has serviceId attribute.

Within the <service> and </service> tags there is a list of rules for filtering state variables. These rules are placed between the <state_variable> and </state_variable> tags. The <state_variable> tag has a name, disable_first_event, maximum_rate and minimum_delta attributes. The name attribute specifies the name of the UPnP state variable, which will be affected by this filter.

The disable_first_event is an optional attribute that indicates that the current value of this state variable should not be transferred to the client.

The maximum_rate is an optional attribute which indicates that the event rate should not exceed the one event per attribute's value (in seconds).

The minimum_delta is an optional attribute which indicates that the event should be delivered to the client only if the difference between the new value of the state variable and the previous one is the minimum_delta steps.

Within the <state_variable> and </state_variable> tags there is a list of rules for filtering state variables event cases.

There are 3 types of rules:

<in_range>—Specifies the range of allowed values. This tag has attributes min and max. When the new announced state variable value is within the specified range, limited by min and max, then this event is forwarded to the client.

<out_range>—Specifies the range of allowed values. This tag has attributes min and max. When the new announced state variable value is outside the specified range, limited by min and max, then this event is forwarded to the client.

<equals>—Specifies the particular allowed value. This tag has a value attribute. There could be more than one such tag within the <state_variable>.

Note 1: If no conditions specified, but the state variable (or wildcard for the set of state variables) is mentioned in the filter rules, then all events form this state variable are allowed without any restrictions.

Note 2: If no state variables specified for the mentioned service then all events form all state variables of this service are allowed without any restrictions.

Note 3: If no services specified for the mentioned device then all events form all state variables of all services of this device are allowed without any restrictions.

Note 4: If no devices specified for the mentioned device then all events form all state variables of all services from all devices are allowed without any restrictions.

EXAMPLES

```
<filter>
    <device udn="uuid:3e53673f-60ae-4cfd-9583-1a1f77faa1a3">
        <service serviceId="urn:upnp-org:serviceId:ClimateControl">
            <state_variable name="Power"/>
            <state_variable     name="CurentTemperature"
maximum_rate="60" minimum_delta="5">
                <out_range min="65" max="85">
            </state_variable>
        </service>
    </device>
</filter>
```

Allow events from all UPnP device with UDN equals to "uuid:3e53673f-60ae-4cfd-9583-1a1f77faa1a3". Allowed events are: all power on/off events and events when the temperature become warmer than 85° F. or colder than 65° F. The temperature related events are allowed only when the value change amount exceeds the limit of 5° F. and not frequently than once per minute (60s).

An exemplary XML description for SIP subscription event package schema is as follows.

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="filter">
        <xs:annotation>
            <xs:documentation>Root element</xs:documentation>
        </xs:annotation>
        <xs:complexType>
            <xs:sequence>
                <xs:element name="device" maxOccurs="unbounded">
                    <xs:complexType>
                        <xs:sequence>
                            <xs:element name="service" maxOccurs="unbounded">
                                <xs:complexType>
                                    <xs:sequence>
                                        <xs:element name="state_variable"
                                            maxOccurs="unbounded">
                                            <xs:complexType>
                                                <xs:choice minOccurs="0">
                                                    <xs:element name="in_range">
                                                        <xs:complexType>
                                                            <xs:attribute name="min"
                                                                type="xs:integer" use="required"/>
                                                            <xs:attribute name="max"
                                                                type="xs:integer" use="required"/>
                                                        </xs:complexType>
                                                    </xs:element>
                                                    <xs:element name="out_range">
                                                        <xs:complexType>
                                                            <xs:attribute name="min"
                                                                type="xs:integer" use="required"/>
                                                            <xs:attribute name="max"
                                                                type="xs:integer" use="required"/>
                                                        </xs:complexType>
                                                    </xs:element>
                                                    <xs:sequence>
                                                        <xs:element name="equals"
                                                            maxOccurs="unbounded">
                                                            <xs:complexType>
                                                                <xs:attribute name="value"
                                                                    type="xs:string"
use="required"/>
                                                            </xs:complexType>
                                                        </xs:element>
                                                    </xs:sequence>
                                                </xs:choice>
                                                <xs:attribute name="name" type="xs:string"
                                                    use="required"/>
                                                <xs:attribute
                                                    name="disable_first_event"
                                                    type="xs:boolean"/>
                                                <xs:attribute name="maximum_rate"
                                                    type="xs:integer"/>
                                                <xs:attribute name="minimum_delta"
                                                    type="xs:integer"/>
                                            </xs:complexType>
                                        </xs:element>
                                    </xs:sequence>
                                    <xs:attribute name="serviceId" type="xs:ID"
                                        use="required"/>
                                </xs:complexType>
                            </xs:element>
                        </xs:sequence>
                        <xs:attribute name="udn" type="xs:ID" use="required"/>
                    </xs:complexType>
                </xs:element>
            </xs:sequence>
        </xs:complexType>
    </xs:element>
</xs:schema>
```

1.2 SIP Event Notification
1. Notify system event (i.e. other UPnP device register/unregistered on the network). Evented information are embedded in SIPEvent upon notification. Evented information includes:
   a. eventType—"UPnP.event.device".
   b. registration/unregistration information)
2. Notify UPnP State variable event
2) Upon notification of the event, SIPEvent needs to carry the following information:
   1. EventType—"UPnP.event.state_variable"
   2. UPnP Device name
   3. UPnP Service name
   4. Evented information pertaining to the interested state variable:
      i. State variable name
      ii. State variable value An exemplary XML description for SIP notification event package schema is as follows.

```
<?xml version="1.0" encoding="UTF-8"?>
<xs:schema      xmlns:xs="http://www.w3.org/2001/XMLSchema"
elementFormDefault="qualified" attributeFormDefault="unqualified">
    <xs:element name="notify">
        <xs:annotation>
            <xs:documentation>Notification</xs:documentation>
        </xs:annotation>
        <xs:complexType>
            <xs:choice>
                <xs:element name="device_removed">
                    <xs:complexType>
                        <xs:attribute name="udn" type="xs:ID" use="required"/>
                    </xs:complexType>
                </xs:element>
                <xs:element name="device_added">
                    <xs:complexType>
                        <xs:attribute name="udn" type="xs:ID" use="required"/>
                    </xs:complexType>
                </xs:element>
                <xs:element name="update">
                    <xs:complexType>
                        <xs:attribute name="name" type="xs:string"
                            use="required"/>
                        <xs:attribute name="udn" type="xs:ID"
                            use="required"/>
                        <xs:attribute name="service_id" type="xs:ID"
                            use="required"/>
                        <xs:attribute name="value" type="xs:normalizedString"
```

```
            use="required"/>
        </xs:complexType>
      </xs:element>
    </xs:choice>
  </xs:complexType>
</xs:element>
</xs:schema>
```

What is claimed is:

1. An event moderating architecture, comprising:

an event publishing environment having a plurality of network devices broadcasting a plurality of event notification messages amongst themselves in accordance with Universal Plug and Play (UPnP) protocol;

a mobile network device residing outside of the event publishing environment the mobile network device operable to formulate a subscription request for receiving event notification messages and transmit the subscription request via a signaling communication protocol to the event publishing environment, where the signaling communication protocol is different than the UPnP subscription-based communication protocol;

an event moderation module adapted to receive the subscription request from the mobile network device and operable to subscribe to the event publishing environment in accordance with the UPnP subscription-based communication protocol, and, upon receipt of the subscription request, to translate the subscription request into a subscription with the event publishing environment, such that the event moderation module receives a subset of event notification messages from the event publishing environment using the UPnPEventListener object, stores the subset of event notification messages in an event pool and forwards select event notification messages in accordance with the subscription request to the mobile network device, wherein said event moderation module translates the subscription request into a state variable event template storing user customizable moderation parameters for events associated with a given UPnP service, and the user customizable moderation parameters include: (a) device and service of the state variable to be evented; and (b) names of state variables to be evented.

2. The event moderating architecture of claim 1 wherein the subscription request specifies a particular state variable of interest and the event moderation module forwards event notification messages which correspond to the particular state variable of interest.

3. The event moderating architecture of claim 1 wherein the subscription request specifies a user customizable moderation parameter for receiving event notification messages and the event moderation module forwards select event notification messages in accordance with the user customizable moderation parameter.

4. The event moderating architecture of claim 1 wherein the user customizable moderation parameter is further defined as a maximum reporting rate for a particular state variable of interest, such that the event moderation module forwards the event notification messages for the particular state variable to the mobile network device when a time interval between the event notification messages for the particular state variable exceeds the maximum reporting rate.

5. The event moderating architecture of claim 1 wherein the user customizable moderation parameter is further defined as a minimum change parameter for a particular state variable of interest, such that the event moderation module forwards the event notification messages for the particular state variable to the mobile network device when a value for the particular state variable changes by an amount which exceeds the minimum change parameter.

6. The event moderating architecture of claim 1 wherein the user customizable moderation parameter is further defined as a range of values for reporting on a particular state variable of interest, such that the event moderation module forwards the event notification messages for the particular state variable when a value for the particular state variable falls within the range.

7. The event moderating architecture of claim 1 wherein the user customizable moderation parameter is further defined as an out-of-range parameter for reporting on a particular state variable of interest, such that the event moderation module forwards the event notification messages for the particular state variable when a value for the particular state variable falls outside of a range of values defined by the out-of-range parameter.

8. The event moderating architecture of claim 1 wherein the subscription request is sent using Session Initiation Protocol (SIP), such that the mobile network device functions as a SIP user agent.

9. The event moderating architecture of claim 1 wherein the event moderation module, upon receipt of the subscription request, formulates a template which defines the event notification messages of interest to the mobile network device.

10. The event moderating architecture of claim 9 wherein the event moderation module applies the template to the subset of event notification messages residing in the event pool and forwards select event notification messages which correlate to the template.

11. The event moderating architecture of claim 1 wherein the event publishing environment further operates in accordance with an Open Services Gateway Initiative (OSGi) specification, such that the event moderation module interfaces with an UPnP service registered with an OSGi registry to receive event notification messages.

12. An event moderating architecture, comprising:

an event publishing environment having a plurality of network devices broadcasting a plurality of event notification messages amongst themselves in accordance with a Universal Plug and Play (UPnP) protocol;

a mobile network device residing outside of the event publishing environment and operating as a user agent in accordance with a Session Initiation Protocol (SIP), the mobile network device operable to formulate a subscription request for receiving event notification messages;

an event moderation module adapted to receive the subscription request from the mobile network device and operable to instantiate an event listening object in accordance with UPnP, such that the event moderation module receives a subset of event notification messages from the event publishing environment using the event listening object and forwards select event notification messages in accordance with the subscription request to the mobile network device, wherein said event moderation module translates the subscription request into a state variable event template storing user customizable moderation parameters for events associated with a given UPnP service, and the user customizable moderation parameters include: (a)

device and service of the state variable to be evented; and (b) names of state variables to be evented.

13. The event moderating architecture of claim 12 wherein the event moderation module is integrated with a proxying agent wherein the proxying agent functions as a SIP entity and interfaces SIP messages received from SIP entitles with UPnP-compliant application program interfaces.

14. The event moderating architecture of claim 12 wherein the subscription request specifies a particular state variable of interest and the event moderation module forwards event notification messages which correspond to the particular state variable of interest.

15. The event moderating architecture of claim 12 wherein the subscription request specifies a user customizable moderation parameter for receiving event notification messages and the event moderation module forwards select event notification messages in accordance with the user customizable moderation parameter.

16. An event moderating architecture, comprising:
an event publishing environment having a plurality of network devices broadcasting a plurality of event notification messages amongst themselves in accordance with a subscription-based communication protocol;
a mobile network device residing outside of the event publishing environment, the mobile network device operable to formulate a subscription request for receiving event notification messages and transmit the subscription request via a signaling communication protocol to the event publishing environment, where the signaling communication protocol is different than the subscription-based communication protocol;
an event moderation module adapted to receive the subscription request from the mobile network device and operable to instantiate an event listening object in accordance with the subscription-based communication protocol, such that the event moderation module receives a subset of event notification messages from the event publishing environment and forwards select event notification messages in accordance with the subscription request to the mobile network device,
wherein said event moderation module translates the subscription request into a state variable event template storing user customizable moderation parameters for events associated with a given service of the subscription-based communication protocol, and the user customizable moderation parameters include: (a) device and service of the state variable to be evented; and (b) names of state variables to be evented.

17. The event moderating architecture of claim 16 wherein the subscription-based communication protocol is further defined as the Universal Plug and Play (UPnP) protocol and the event listening object is further defined as the UPnPEvent Listener object.

18. The event moderating architecture of claim 16 wherein the subscription request specifies a particular state variable of interest and the event moderation module forwards event notification messages which correspond to the particular state variable of interest.

19. The event moderating architecture of claim 16 wherein the subscription request specifies a user customizable moderation parameter for receiving event notification messages and the event moderation module forwards select event notification messages in accordance with the user customizable moderation parameter.

20. The event moderating architecture of claim 19 wherein the user customizable moderation parameter is further defined as a maximum reporting rate for a particular state variable of interest, such that the event moderation module forwards the event notification messages for the particular state variable to the mobile network device when a time interval between the event notification messages for the particular state variable exceeds the maximum reporting rate.

21. The event moderating architecture of claim 19 wherein the user customizable moderation parameter is further defined as a minimum change parameter for a particular state variable of interest, such that the event moderation module forwards the event notification messages for the particular state variable to the mobile network device when a value for the particular state variable changes by an amount which exceeds the minimum change parameter.

22. The event moderating architecture of claim 19 wherein the user customizable moderation parameter is further defined as a range of values for reporting on a particular state variable of interest, such that the event moderation module forwards the event notification messages for the particular state variable when a value for the particular state variable falls within the range.

23. The event moderating architecture of claim 19 wherein the user customizable moderation parameter is further defined as an out-of-range parameter for reporting on a particular state variable of interest, such that the event moderation module forwards the event notification messages for the particular state variable when a value for the particular state variable falls outside of a range of values defined by the out-of-range parameter.

24. The event moderating architecture of claim 19 wherein the subscription request is sent using Session Initiation Protocol (SIP), such that the mobile network device functions as a SIP user agent.

25. The event moderating architecture of claim 16 wherein the event moderation module, upon receipt of the subscription request, formulates a template which defines the event notification messages of interest to the mobile network device.

26. The event moderating architecture of claim 25 wherein the event moderation module applies the template to the subset of event notification messages residing in the event pool and forwards select event notification messages which correlate to the template.

27. The event moderating architecture of claim 16 wherein the event publishing environment further operates in accordance with an Open Services Gateway Initiative (OSGi) specification, such that the event moderation module interfaces with an UPnP service registered with an OSGi registry to receive event notification messages.

* * * * *

UNITED STATES PATENT AND TRADEMARK OFFICE
CERTIFICATE OF CORRECTION

PATENT NO. : 7,289,795 B2  Page 1 of 1
APPLICATION NO. : 11/159057
DATED : October 30, 2007
INVENTOR(S) : Yue Ma et al.

It is certified that error appears in the above-identified patent and that said Letters Patent is hereby corrected as shown below:

Col. 11, Line 7, Claim 13: "entitles" should be --entities--

Signed and Sealed this

Fifteenth Day of April, 2008

JON W. DUDAS
*Director of the United States Patent and Trademark Office*